United States Patent [19]

Delaney et al.

[11] 4,393,037
[45] Jul. 12, 1983

[54] METHOD FOR RECONDITIONING BACTERIA-CONTAMINATED HYDROGEN SULFIDE REMOVING SYSTEMS

[75] Inventors: Dennis D. Delaney, Placentia; Donald M. Fenton, Anaheim, both of Calif.

[73] Assignee: Union Oil Company of California, Brea, Calif.

[21] Appl. No.: 331,070

[22] Filed: Dec. 16, 1981

[51] Int. Cl.³ .................. B01D 53/34; C01B 17/04; C01B 17/14
[52] U.S. Cl. .................. 423/573 R; 423/226; 423/571; 423/578 R; 210/764
[58] Field of Search .............. 423/226, 227, 571, 573, 423/578; 210/764

[56] References Cited

U.S. PATENT DOCUMENTS

| | | |
|---|---|---|
| 2,987,475 | 6/1961 | Legator .............................. 252/8.55 |
| 3,049,492 | 8/1962 | DeGroote et al. ................ 252/8.55 |
| 3,329,610 | 7/1967 | Kreuz et al. ....................... 252/8.55 |
| 3,714,100 | 1/1973 | Biale et al. .................. 260/29.6 TA |
| 4,206,194 | 6/1980 | Fenton et al. .................... 423/573 R |
| 4,292,293 | 9/1981 | Johnson et al. ..................... 423/571 |

FOREIGN PATENT DOCUMENTS 52-10857 1/1977 Japan .................................. 423/226

OTHER PUBLICATIONS

"Refiners Focus on Sulfur Recovery" *Oil & Gas Journal*, Jun. 28, 1982.
"First Commercial Test is Successful for Catalytic Hydrogen Sulfide Oxidation Process," A. J. Cabodi, H. R. Van, and L. C. Hardison, *Oil & Gas Journal*, Jul. 5, 1982.

*Primary Examiner*—Earl C. Thomas
*Attorney, Agent, or Firm*—Dean Sandford; Gregory F. Wirzbicki; Denton L. Anderson

[57] ABSTRACT

A method is provided for reconditioning a hydrogen sulfide removal system, such as a Stretford process system in which elemental sulfur is formed, after the system has become contaminated with sulfur-feeding bacteria to an extent that operation thereof is substantially impaired. The method includes adding a bactericide to the washing solution employed in the system to destroy the bacteria and adding a non-ionic surfactant to the solution to remove dead bacteria from the surfaces of particulate sulfur formed in the system so that the particles can agglomerate in the intended manner to enable sulfur removal from the solution.

19 Claims, 1 Drawing Figure

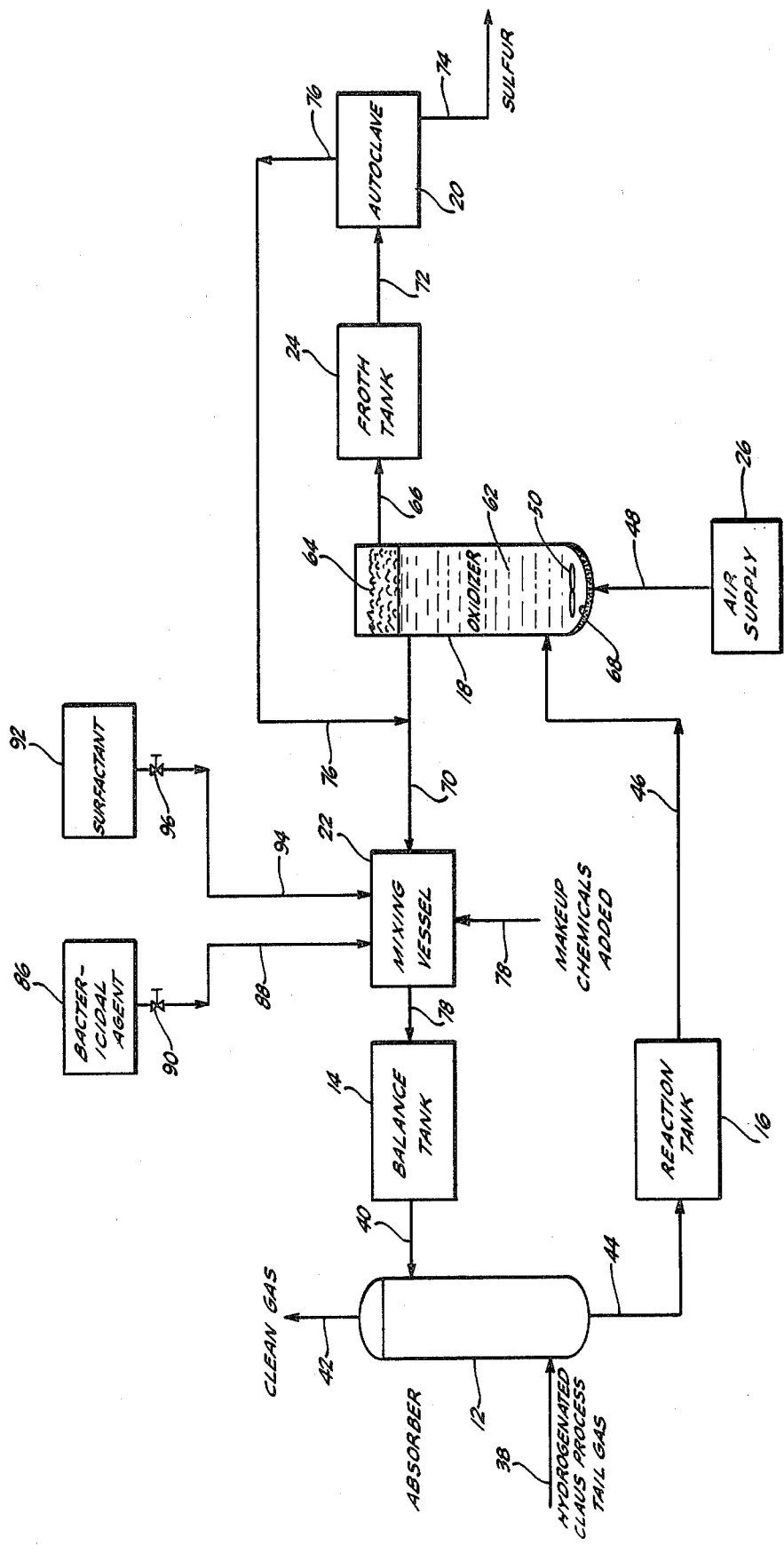

METHOD FOR RECONDITIONING BACTERIA-CONTAMINATED HYDROGEN SULFIDE REMOVING SYSTEMS

BACKGROUND OF THE INVENTION

The present invention relates generally to the removal of hydrogen sulfide from gas streams by contacting a gas stream with an aqueous washing solution, and more particularly to reconditioning of such solutions and associated hydrogen sulfide removal systems after they have become contaminated with sulfur-feeding bacteria which thrive in the washing solution and which adversely affect removal of hydrogen sulfide by the system.

With the increasing concern over atmospheric pollution and the concomitant increasingly strict enforcement of tight air pollution standards, ever greater responsibility is placed on industry to produce pollution-free products in a non-polluting manner. An area of particular environmental concern has been, and is, the discharge or release of sulfur and its compounds, especially hydrogen sulfide, into the atmosphere as a result of various industrial processes. These processes include, for example, petroleum refining, the sweetening of sour natural gas, destructive distillation of coal and oil shale, gasification or liquefication of coal and production and use of hydrogen sulfide-containing geothermal steam and liquid for generating electricity or for other uses.

Several processes have been developed, and are in relatively common use, for removing hydrogen sulfide from gas streams such as those generated and/or encountered in the industrial processes listed above. Such hydrogen sulfide removal processes as the Stretford and the Takahax processes, employ an aqueous, alkaline washing solution to absorb hydrogen sulfide from a gas stream, for example, a tail gas from a Claus apparatus. Vanadates in the washing solution convert the hydrogen sulfide to elemental sulfur, which is then removed in particulate form from the washing solution. The sulfur removal may be accomplished in an autoclave in which small sulfur particles are agglomerated for removal purposes. Washing solutions employed in these hydrogen sulfide removal processes are typically regenerated for reuse by injecting air into and through the solutions, the oxygen contained in the air reoxidizing the vanadate or other metal compound used.

By way of background, the washing solution employed in the Stretford process contains a water-soluble salt of 9,10 anthraquinone disulfonic acid (ADA) and a water-soluble vanadate (or other multivalent metal) compound. The Takahax process, in contrast, uses a washing solution containing a water-soluble naphthaquinone sulfonate (NQS), alone or in combination with a multivalent metal compound. The hydrogen sulfide removal process disclosed in U.S. Pat. No. 4,283,379 to Fenton et al. employs a washing solution containing solubilized vanadium, one or more water-soluble non-quinone aromatic compounds, thiocyanate ions and a water-soluble carboxylate complexing agent.

It is known in the petroleum industry that certain types of bacteria which live on sulfur can cause serious problems in those petroleum operations in which sulfur and/or sulfur compounds are present. U.S. Pat. No. 3,329,610 to Kreuz et al., for example, discusses the bacterial problems encountered in secondary oil recovery operations employing water flooding or injection. Sulfur-feeding bacteria in these secondary oil recovery operations have been found to cause severe corrosion of metal equipment and, when present in sufficiently large numbers, to cause plugging of pores in the associated oil bearing earth formations. The two classes of bacteria believed responsible for these problems are identified in the Kreuz et al. patent as Disulforibrio desulfuricans (sulfate reducers), an anerobe, and Pseudomonas, an aerobe.

Recently, applicants have discovered sulfur-feeding bacteria in certain hydrogen sulfide gas removal systems, namely Stretford process systems. Although some hydrogen sulfide washing solutions, such as those disclosed in the above-cited patent to Fenton et al. are considered hostile to living organisms because of containing cyanide compounds, other hydrogen sulfide washing solutions, such as those used in the Stretford process, appear to support the growth of at least some types of sulfur-feeding bacteria. The Stretford process washing solutions, because of their hot, aqueous nature, appear to promote the breeding of sulfur-feeding bacteria to an extent that severe problems with hydrogen sulfide removal may result.

In specific respect to the observed sulfur bacteria problems in Stretford process washing solutions, bacteria entering the elemental sulfur-removing autoclave are apparently killed by the increased temperature encountered in the autoclave. After being killed, however, the dead bacteria have been found to remain adhered to the sulfur particles on which they had been feeding and thereby form a coating which prevents the sulfur particles from agglomerating in the normal manner required for sulfur removal. As a consequence, the sulfur particles are recirculated with the washing solution from the autoclave back into the rest of the system and interfere with the hydrogen sulfide gas removal process.

The living bacteria in the system, particularly in the solution regeneration (vanadate reoxidation) vessel, have been found to produce large amounts of slime and to cause excessive solution frothing, both effects inhibiting the solution regeneration process. Since elemental sulfur is formed in the regeneration vessel, the vessel is considered a good breeding ground for the sulfur-feeding bacteria, the bacteria being bred in the vessel at a faster rate than bacteria are killed in the autoclave. Since the washing solution is also recirculated from the regeneration vessel, sulfur-feeding bacteria are continually circulated through the entire system from the vessel.

Due to the effects of the sulfur-feeding bacteria, the hydrogen sulfide removal capacity of the washing solution rapidly decreases as the bacterial contamination increases. As a result, the industrial process with which the hydrogen sulfide removal process is associated must usually be curtailed with production being lost and/or production costs being increased.

Insofar as is known, degradation of hydrogen sulfide washing solutions has not heretofore been attributed to sulfur-feeding bacteria. Most attempts to alleviate problems of washing solution degradation are believed to have involved replacing only a portion of the degraded washing solution with fresh washing solution. However, in the case of bacterial contamination of the washing solution, replacement of only a portion of the washing solution would result in bacterial contamination of the newly added solution, and any beneficial effects of adding the fresh solution would be only temporary.

Since hydrogen sulfide removal systems, such as Stretford process systems, typically employ between about 100,000 and 500,000 gallons of washing solution, total washing solution replacement is relatively costly. Substantial additional costs may be associated with disposal of the replaced washing solution. As a result, replacement of the entire washing solution is not economically attractive, even if it were possible to clean the system sufficiently to remove all traces of bacteria which could cause infestation of the replacement washing solution. Also, considerable down time would be required for the cleaning operation.

In respect to known sulfur feeding bacterial problems associated with water flooding or injection for secondary oil recovery, the above-identified patent to Kreuz et al., as well as U.S. Pat. Nos. 2,987,475 and 3,049,492 to Legator and DeGroote et al., respectively, disclose use of specific bactericides with which the water may be treated as a preventative measure. Use of peracetic acid, olefinically unsaturated lower alkyl aldehydes and certain oxirane ring containing compounds as bactericides are disclosed in the patents mentioned above. However, none of these disclosed bactericides are considered adaptable for use in hydrogen sulfide washing solutions, largely because the chemical composition of these solutions and the conditions of use differ so greatly from the compositions used in secondary oil recovery and the like.

A significant aspect of the problem of bacterial contamination or infestation of hydrogen sulfide removal systems, such as Stretford process systems, is that the contamination problem is not universal but seems to occur only in a portion of the hydrogen sulfide removal systems. Although the bacterial contaminations appear limited principally to systems located in hot, moist climates, as may be found, for example, around the Gulf of Mexico in the United States, not all similar systems in this type climate become contaminated. Furthermore, the bacterial infestations appear to be cyclic in nature and may be dependent upon as yet unknown cyclic characteristics of the bacteria. As a result, even after the bacterial nature of the hydrogen sulfide removal process has been identified, universally applied preventive techniques do not appear economically feasible.

An important need therefore exists for an effective economical method for reconditioning hydrogen sulfide removal systems which have become infested or contaminated by sulfur-feeding bacteria to an extent that effectiveness of the hydrogen sulfide removal system is substantially impaired.

Accordingly, it is a principal object of the present invention to provide a method for reconditioning hydrogen sulfide removal systems and washing solutions which have become badly infested with sulfur-feeding bacteria.

Still another object of the invention is to prevent subsequent bacterial reinfestation of the hydrogen sulfide removal system and washing solution by the sulfur-feeding bacteria after the system and solution have been reconditioned.

Further objects, advantages and features of the invention will become apparent to those skilled in the art from the following description when taken in conjunction with the accompanying drawing.

SUMMARY OF THE INVENTION

In accordance with the present invention, a method is provided for reconditioning a hydrogen sulfide gas removal system utilizing an aqueous washing solution in which hydrogen sulfide is reacted to form particles of elemental sulfur, especially in systems employing means for agglomerating such particles to enable sulfur removal from the washing solution and means for regenerating the washing solution to enable its reuse when the system and the washing solution become contaminated with living, sulfur-feeding bacteria to an extent that normal operation of the sulfur removal system and washing solution regenerating means are substantially impaired. The reconditioning method comprises contacting the sulfur-feeding bacteria in the solution with a bactericidal agent in an amount destroying substantially all of the bacteria. The method further includes adding to the solution a surfactant in an amount to remove a sufficient number of destroyed bacteria from surfaces of the sulfur particles to enable agglomeration of the sulfur particles for removal purposes.

The bactericidal agent is usually selected so as to be water-soluble, non-sulfur soluble, non-interfering with the oxidation of hydrogen sulfide to elemental sulfur and decomposable into non-polluting by-products. Preferably the bactericidal agent is selected from the group consisting of phenols and phenol compounds with phenol being most preferred.

The usual surfactant for use in the invention is a non-ionic polymeric compound. The preferred surfactant is a non-ionic copolymer of polypropylene oxide and ethylene oxide.

The reconditioning method further provides, after the hydrogen sulfide removal system and washing solution have been reconditioned by employing the preselected bactericidal agent and surfactant, for the addition of the bactericidal agent in amounts sufficient to prevent recontamination of the system and washing solution by the bacteria.

The method of this invention reconditions a hydrogen sulfide removal system and washing solution employed therein by destroying sulfur-feeding bacteria contaminating the system and solution and by preventing the destroyed bacteria, as well as any bacteria killed in the sulfur removing means, from adhering to surfaces of sulfur particles formed in the solution during the hydrogen sulfide removal process. The method also prevents recontamination of the system and washing solution by unkilled bacteria left in the system or solution or by live bacteria entering the system or solution from the outside.

BRIEF DESCRIPTION OF THE DRAWING

The present invention will be more readily understood by reference to the drawing, in which is depicted an exemplary hydrogen sulfide gas removal system with which the present reconditioning method may be used to advantage.

DESCRIPTION OF THE PREFERRED EMBODIMENT

The reconditioning method of the present invention is suitable for use with a wide variety of hydrogen sulfide removal systems and the washing solutions employed therein when such systems and washing solutions have become severely contaminated or infected with sulfur-feeding bacteria. Although, for illustrative purposes, the method is hereinbelow described in particular respect to reconditioning a Stretford process system employing an aqueous, alkaline washing solution containing a water-soluble vanadate and water-soluble anthraquinone disulfonic acid (ADA), it is to be understood that the method is not so limited but is also applicable to other hydrogen sulfide removal systems employing washing solutions which promote the growth of sulfur-feeding bacteria.

The term "sulfur-feeding bacteria" is used herein for convenience and is to be attributed a broad meaning so as to include bacteria or living microorganisms of any type that act detrimentally on or with sulfur, regardless of the particular mechanism involved. For example, a sulfur-carbon transfer is believed associated with at least some types of bacteria which are considered to be sulfur-feeding within the broad definition of the term. Carbon from the solution, presumably from carbonates, is ultimately absorbed by these bacteria for cell building needs. In the transfer process, sulfur is converted to sulfates, which may additionally inhibit the hydrogen sulfide removal capacity of the system.

For a better understanding of the invention, the drawing depicts an exemplary Stretford process system, into which, in accordance with the invention, a bactericide and a surfactant are added after the system has become contaminated with sulfur-feeding bacteria. Shown generally comprising the system are absorber vessel 12, balance tank 14, reaction tank 16, oxidizer vessel 18 and autoclave 20. Also included in system 10 are mixing vessel 22, froth tank 24 and air supply 26.

A hydrogen sulfide-containing gas stream, for example a Claus process tail gas stream, flows into lower regions of absorber vessel 12 through conduit 38. Typically, the gas stream contains between about 0.5 and about 5.0 mole percent of hydrogen sulfide. From balance tank 14 hydrogen sulfide washing solution flows into upper regions of absorber vessel 12 through conduit 40. A pump, not shown, may be used to pump the washing solution from tank 14 into vessel 12.

Within vessel 12, which may contain a number and/or variety of baffle plates, not shown, the hydrogen sulfide gas-containing stream from conduit 38 rises towards the top of vessel 12 in counter-flow with the downwardly flowing washing solution introduced from conduit 40. As a result of this counter-flow, and preferably intermixed flow, of gas and washing solution through vessel 12, hydrogen sulfide is extracted from the gas by the washing solution and is carried along therewith. Alternatively, one or more venturi or other gas-liquid contacting apparatus may be employed in conjunction with, or in replacement of, absorber 12.

Sodium carbonate may be utilized in the washing solution to react with the hydrogen sulfide from the gas stream in vessel 12 to form sodium hydrosulfide according to the following reaction:

$$H_2S + Na_2CO_3 \rightarrow NaHS + NaHCO_3 \quad (1)$$

In turn, the sodium hydrosulfide is oxidized to elemental sulfur by the water-soluble vanadate in the solution according to the reaction:

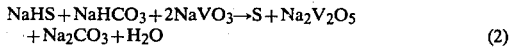

$$NaHS + NaHCO_3 + 2NaVO_3 \rightarrow S + Na_2V_2O_5 + Na_2CO_3 + H_2O \quad (2)$$

The hydrogen sulfide stripped gas is vented from the top absorber vessel 12 through conduit 42, venting being normally into the atmosphere. The washing solution is discharged from the bottom of vessel 12 through conduit 44 into reaction tank 16 where further and complete chemical conversion to elemental sulfur, in accordance with reaction (2), occurs. The washing solution and gas stream residence time in vessel 12 typically varies between about 10 and 15 minutes.

The sulfur-containing washing solution flows from reaction tank 16 through conduit 46 into the lower regions of oxidizer vessel 18. A pump (not shown) is used to pump the solution from tank 16 into oxidizer vessel 18. Air is injected into the bottom of oxidizer vessel 18 from air supply 26, through conduit 48, and is preferably churned into a large number of small bubbles by rotating stirrer-mixer 50 located above the air inlet. These air bubbles rise through the solution in oxidizer vessel 18, thereby reoxidizing the solution, which was chemically reduced in absorber vessel 12 and reaction tank 16, to its initial state. Thus, the vanadium, which by reaction (2) had been reduced from its pentavalent state to the quadravalent state ($V^{+5}$ to $V^{+4}$), is oxidized in oxidizer vessel 18 by the upwardly flowing air from source 26, back to its original pentavalent state, the ADA in the washing solution acting as a catalyst. The reaction involved is:

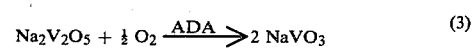

$$Na_2V_2O_5 + \tfrac{1}{2} O_2 \xrightarrow{ADA} 2 NaVO_3 \quad (3)$$

In this manner, the washing solution is regenerated in oxidizer vessel 18 for reuse in the system.

Most of the elemental sulfur in oxidizer vessel 18 rises to the top of the washing solution, identified generally as 62, and forms a froth 64 on top of solution 62. This sulfur froth 64 is withdrawn, accompanied by a small amount of regenerated washing solution, through conduit 66 to froth tank 24. Some of the sulfur in oxidizer vessel 18, however, settles to the bottom of the vessel to form sulfur layer 68. The reconditioned washing solution, with the exception of that amount discharged with sulfur froth 64 into conduit 66, is discharged through conduit 70 to mixing vessel 22.

From froth tank 24 the elemental sulfur and washing solution are discharged through conduit 72 into autoclave 20. The sulfur, discharged into autoclave 20 as small particles, is agglomerated at an elevated temperature and then drawn off from bottom regions of autoclave 20 through conduit 74. The washing solution is recirculated from autoclave 20 through conduit 76, which is connected into conduit 70 between oxidizer vessel 18 and mixing vessel 22.

Make-up chemicals, such as ADA and vanadate solutions, are added to the washing solution in mixing vessel 22 via conduit 78 in amounts required to maintain the desired concentration levels in the washing solution. From mixing vessel 22, the washing solution, which is largely regenerated solution from oxidizer vessel 18, is discharged through conduit 78 to balance tank 14. As previously described, the washing solution from balance tank 14 is discharged into absorber vessel 12 through conduit 40, thereby completing the washing solution recirculation loop.

When the system becomes contaminated or infested with sulfur-feeding bacteria, the bacteria tend to become concentrated in sulfur froth 64 in oxidizer vessel 18 and are discharged with the sulfur through froth tank 24 into autoclave 20, wherein most of the bacteria are killed at the higher autoclave temperature. The dead bacteria, however, adhere or remain attached to the sulfur particle surfaces and thereby prevent the agglomeration of the particles required for sulfur removal. As a result, the sulfur particles remain in suspension in the washing solution and are recirculated from autoclave 20 with the washing solution through conduit 76.

The sulfur layer 68 at the bottom of oxidizer vessel 18 also provides a rich breeding ground for the bacteria, and indeed, bacteria in the sulfur layer tend to reproduce at a faster rate than that at which bacteria are removed with sulfur froth 64. As a consequence, the bacteria population in the system increases rapidly after initial system contamination by the bacteria.

Apparently as the result of the bacteria breeding in oxidizer vessel 18, in particular in sulfur layer 68, an excessive amount of sulfur frothing occurs and large amounts of slime are formed in oxidizer vessel 18. Both the excessive sulfur frothing and slime formation inhibit the solution regeneration (vanadium reoxidation) reaction in oxidizer vessel 18, thereby degrading the effectiveness of the washing solution. In addition, some of the excessive sulfur froth and slime formed in the upper regions of oxidizer vessel 18 are recirculated with the washing solution back upstream through mixing vessel 22 and balance tank 14 into absorber vessel 12 and therein inhibit the hydrogen sulfide removal process.

As a result of bacterial growth and increasing bacterial contamination, the effectiveness of the washing solution for removing hydrogen sulfide from the gas stream entering absorber vessel 12 through conduit 38 diminishes, often at a quite rapid rate. This degradation of the system in turn requires curtailment of the associated industrial process from which the hydrogen sulfide-containing gas stream is received in order that allowable hydrogen sulfide emission levels not be exceeded.

The present method reconditions the washing solution and the entire system during operation and the system is returned to normal operation without necessity for washing solution replacement.

Accordingly, the reconditioning method comprises adding a bactericide or bactericidal agent into the bacteria-contaminated washing solution in an amount and at a rate destroying all or substantially all of the sulfur-feeding bacteria in the entire system. As shown in the FIGURE, source 86 of the bactericidal agent discharges into mixing vessel 22 through conduit 88 so as to enable intimate mixing of the bactericidal agent with the washing solution. Valve 90 in conduit 88 enables control of the amount of bactericidal agent added from source 86 into mixing vessel 22. Less preferably, source 86 may alternatively be flow connected into balance tank 14 or into oxidizer vessel 18.

The normal recirculating flow of washing solution from mixing vessel 22 rapidly and thoroughly distributes the bactericidal agent throughout the system, thereby causing rapid destruction of the sulfur-feeding bacteria. As above-mentioned, however, the dead bacteria tend to cling to the surface of sulfur particles on which they were feeding and so inhibit sulfur particle agglomeration in, and hence sulfur removal from, autoclave 20. In consequence, the sulfur and dead bacteria are recirculated through the system from autoclave 20 so as to inhibit the hydrogen sulfide removal process. The excessive sulfur froth and slime formed in oxidizer vessel 18 by the bacteria are circulated through the system from vessel 18 and also inhibit the hydrogen sulfide removal process. Thus, although addition of the bactericidal agent to mixing vessel 22 prevents further degradation of the hydrogen sulfide removal process in the system, the bactericidal agent does not by itself recondition the system to its pre-bacterial contamination effectiveness.

Therefore, to fully recondition the system after bacterial contamination, a surfactant is also added. As shown in the Drawing, source 92 of surfactant is flow connected into mixing vessel 22 by conduit 94. Valve 96 in conduit 94 controls flow of surfactant from source 92 into mixing vessel 22. Surfactant from source 92 may alternatively, but less preferably, be added into balance tank 14 or oxidizer vessel 18.

As the surfactant is circulated in the washing solution through the system from mixing vessel 22, the recirculated sulfur particles, dead bacteria, froth and slime are swept into autoclave 20 from which they are removed, through conduit 74, by the normal sulfur removal process. Accordingly, much larger than normal amounts of sulfur, with the other contaminants, are removed at first and effective system reconditioning is evidenced by unusually large amounts of sulfur being extracted from autoclave 20.

Several days of operation are usually required, after addition of the bactericidal agent and surfactant into mixing vessel 22, before the system is completely reconditioned. During these several days, hydrogen sulfide removal capacity is gradually restored and effectiveness of the system is increased so that any curtailment of the associated industrial process can be reduced. It is emphasized that this system reconditioning is normally accomplished without necessity for replacement of any of the washing solution, although recovery of the system may in some instances be accelerated by accompanying replacement of some of the washing solution.

After the system has been completely reconditioned by addition of sufficient amounts of the bactericidal agent and surfactant, further addition of bactericidal agent, at least for a period of time assuring that no recontamination occurs by sulfur-feeding bacteria which may have initially escaped destruction, may be desirable. Consequently, the present method includes introduction of additional bactericidal agent from source 86 into the system, preferably into mixing vessel 22. Ordinarily, the rate at which the bactericidal agent is added after the system has been completely reconditioned is less than the rate at which the bactericidal agent is added to achieve system reconditioning. That is, the concentration of bactericidal recontamination of the system will normally be less than that required to recondition the system, particularly when relatively large amounts of bactericidal agent have been used to achieve rapid system reconditioning.

It will be appreciated, however, that the amounts of bactericidal agent and surfactant required to recondition the system depend upon such factors as the extent of bacterial contamination, the length of time the system has been contaminated, the type of bacteria involved, and the type of hydrogen sulfide removal system.

While many types of bactericidal agents may be effective against sulfur feeding bacteria, it is important that the agent selected for use in the hydrogen sulfide removal system not be detrimental to normal operation of the system and that it not introduce any additional or new contaminants which may cause a pollution problem. Accordingly, the bactericidal agent should be water-soluble and non-soluble in sulfur for effectiveness of the agent in the hydrogen sulfide removal system. Furthermore, the bactericidal agent selected should not interfere with either the oxidation of hydrogen sulfide to elemental sulfur by the process or the regeneration of the washing solution, for example, reoxidation of the vanadate. Still further, the selected bactericidal agent should be decomposable into innocuous, nonpolluting by-products and should not be unduly dangerous to use and store.

The bactericidal agent of this invention accordingly includes various water-soluble unsubstituted phenols and substituted phenols including their salts and their hydrate forms, with phenol being the preferred bactericidal agent. As used herein, the term "phenol" means the organic compound consisting of a benzene ring having one hydroxyl group joined to the ring.

The unsubstituted phenols which can be used include phenol and various water-soluble phenol salts. Exemplary water-soluble, unsubstituted phenols include phenol and sodium phenoxide.

The substituted phenols that can be used include various water-soluble hydroxy-substituted phenols, carboxy-substituted phenols, sulfonate-substituted phenols, amino-substituted phenols, amido-substituted phenol, nitro-substituted phenols, and their phenol salts. Other substituted phenols which can be used include various water-soluble alkyl-substituted phenols, aryl-substituted phenols, benzo-substituted phenols, halogen-substituted phenols and their phenol salts. Exemplary water-soluble, substituted phenols include hydroquinone; resorcinol; catechol; mixtures of hydroquinone, catechol, and resorcinol; salicylic acid; 3,5-disulfopyrocatechol; p-aminophenol; p-hydroxybenzamide; p-nitrophenol; ortho-cresol; meta-cresol; para-cresol; cresol (commercial mixture of o, m, and p-cresol); p-carboxyphenol; 1-nitro-2-naphthol; 1-naphthol; and chlorophenols.

If salts of the water-soluble, phenolic complexing agents are used, the sodium salt is preferred, although salts of other alkali metals, such as potassium, can also be used.

As used herein, the term "substituted" is not exclusive and allows for substitutions other than the group denominated. For example, a carboxy-substituted phenol may have one or more carboxy groups and one or more other groups substituted thereon.

Normally the bactericidal agent is added to the washing solution at a concentration of at least about 5 parts per million (ppm) but generally below about 5,000 ppm, according to the extent of the bacterial infestation; a concentration range of between about 10 ppm and about 100 ppm being preferred, and between about 10 and about 50 being more preferred. The range of about 10 ppm to about 100 ppm is particularly adapted for the maintenance stage after the system and solution have been reconditioned.

Similar considerations relating, for example, to water-solubility, non-sulfur solubility and non-process interference also apply to selection of a suitable surfactant. Because the bacterial coating effect on the sulfur which prevents sulfur particle agglomeration in autoclave 20 is non-ionic, a non-ionic surfactant is preferred. However, ionic surfactants may alternatively be used, although, sometimes with less effectiveness.

Suitable surfactants include polyoxyethylene condensates represented by the following general formula:

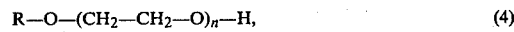

wherein R is the residue of a fatty alcohol, acid, amide, or amine having from about 10 to about 18 carbon atoms or an alkyl phenol having from about 10 to about 18 carbon atoms; and where n is an integer of 1 or above and preferably between about 5 and about 30. Some specific examples of polyoxyethylene condensates which can be used are polyoxyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide and N-lauryl-N-polyoxyethylene thioethers such as polyoxyethylene n-dodecyl thioether.

Some other examples of polyoxyethylene ether compounds are polyoxyethylene nonylphenyl ether having a cloud point of between 126° and 133° F. and marketed under the trademark "Igepal CO-630" and a polyoxyethylene nonylphenol ether having a cloud point above 212° F. and marketed under the trademark "Igepal CO-887." A similar polyoxyethylene nonyl-phenyl ether having a cloud point of about 86° F., marketed under the trademark "Igepal CO-610," is also a good surfactant. "Igepals" are marketed by General Analine and Film Company. Another surfactant is polyoxyethylene octylphenyl ether having a cloud point of between 80° F. and 160° F. and marketed by Rohm and Haas Company under the trademark "Triton X-100." Other surfactants which may be used include a polyoxyethylene oleyl ether having a cloud point of between 80° F. and 160° F. and marketed by ICI Americas, Inc. under the trademark "Atlas G-3915" and a polyoxyethylene lauryl ether having a cloud point above 190° F. and marketed by Atlas Chemical Industries, Inc. under the trademark "Brij 35."

The nonionic surfactants which can be used also include a group of compounds marketed by Wyandotte Chemicals Corporation under the trademark "Pluronics." "Pluronics" have the following general formula:

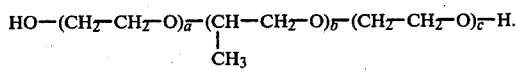

wherein a, b and c are integers between about 1 and about 100. As the ratio of b to a and c increases, the compounds become less water soluble and more oil soluble, and thus more hydrophobic; in contrast, as the ratio of b to a and c decreases, the compounds become more water soluble and less oil soluble, and thus more hydrophilic. An example of this group of compounds is "Pluronics L-61" which has a polyoxypropylene chain having a molecular weight of about 1,500 to 1,800 and a polyoxyethylene content that is about 5 to 15 percent of the total weight of the molecule. Another example is "Pluronics L-64" which has a polyoxypropylene chain having a molecular weight of about 1,500 to 1,800 and a polyoxyethylene content that is about 35 to 45 percent of the total weight of the molecule. Still another useful example is "Pluronics L-81" which has a polyoxypropylene chain having a molecular weight of about 2,100 to 2,600 and a polyoxyethylene content that is about 5 to 15 percent of the total weight of the molecule. These compounds may be considered to be copolymers of polypropylene and polyethylene oxides.

Still another series of suitable surfactants that can be used are ethylene oxide adducts of acetylenic glycols marketed by Air Products & Chemicals, Inc. under the trademark "Surfynol." "Surfynols" can be represented by the following general formula:

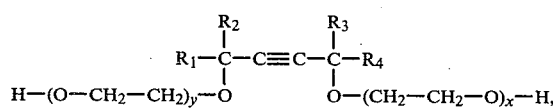 (6)

in which $R_1$ and $R_4$ are alkyl radicals containing from about three to about 10 carbon atoms, $R_2$ and $R_3$ are selected from the group consisting of methyl and ethyl, and x and y are integers having a sum in the range of about 3 to about 60.

Representative of the "Surfynols" are "Surfynol 365" which is an ethylene oxide adduct of 2,4,7,9-tetramethyl decynediol containing an average of 10 moles of ethylene oxide per mole of the surfactant. "Surfynol 485" corresponds to "Surfynol 465" but contains an average of 30 moles of ethylene oxide per mole of surfactant. "Surfynol 485" has a cloud point above 212° F.

Typically the surfactant is added to the washing solution at a concentration of at least about 10 ppm, but generally below about 100,000 ppm, with a preferred concentration range of between about 1,000 ppm and about 5,000 ppm.

The present invention is further illustrated by the following examples which are illustrative of various aspects of the invention and are not intended as limiting the scope of the invention as defined by the appended claims.

EXAMPLE 1

The following laboratory procedure is used to demonstrate the effectiveness of the bactericidal agent and surfactant in reconditioning a Stretford washing solution.

Sulfur particles about 1/16 inch in diameter from an autoclave (corresponding to autoclave 20) are melted in an open beaker and are found to have an apparent melting point of about 284° F., whereas the melting point of pure sulfur is about 235° F. A black frothy substance is found at the top of the melted material and the melted material itself is found to be black instead of yellow upon cooling. The melted material congeals at about 203° F., indicating a marked melting point lowering due to impurities. After the black frothy material is removed, the material remelts at about 203° F.

An examination of the autoclave sulfur particles reveals that the moist sulfur cake from the froth tank is teeming with live bacteria of cocci-type about 1 micron in diameter. The bacteria are vigorous in movement, suggesting a phototropic nature, and are found to be feeding on the sulfur.

It is known that sulfur-feeding bacteria usually require temperatures of about 90° F. to survive and are killed by autoclave temperatures. Cellulose, the dominant organic material in the bacteria cell wall, is known to decompose upon heating to yield carbon. The melted sulfur is found to contain about 5,000 ppm of carbon.

Some of the moist sulfur cake is filtered through an 8 micron filter paper which permits the bacteria to pass through but not most of the sulfur. The sulfur is found to have a melting point of about 235° F.

Phenol is added to a solution containing the bacteria, at a concentration level of about 10 ppm phenol; after 24 hours approximately 99 percent of the bacteria are found to have been killed by the phenol.

Approximately 100 milliliters of the nonagglomerated sulfur particle slurry from autoclave are heated to about 284° F. for about 30 minutes under 400 psig of nitrogen gas. Approximately 1,000 ppmv of "Pluronic L-61" is added to the solution. When the solution is cooled, the sulfur particles are found to have agglomerated into a single large piece of sulfur. Phenol alone is found to have little or no effect on sulfur agglomeration.

EXAMPLE 2

In a second experiment, a Stretford process system is sterilized by addition of about 150 ppm of phenol-cresol mixture, with the bacteria kill being apparently complete. A sample of slurry from the system is treated with about 3,000 ppmv of "Pluronic L-61" and all the sulfur is separated as molten sulfur at temperatures of either 260° F. or 280° F.

The entire Stretford process system is then treated with 250 ppmv of "Pluronic L-61," and recovery of sulfur from the autoclave is about trebled. Very fine sulfur particles in the oxidizer vessel are coagulated and separated by laboratory centrifuge. The removed sulfur is found not to be of particularly good quality, whereupon more "Pluronic L-61" is added to raise the total concentration thereof to about 1,000 ppmv. The quality of removed sulfur is improved by such addition. Soon after the second addition of "Pluronic L-61," froth is found to collapse throughout the system.

Although a particular embodiment of the invention has been described, it will, of course, be understood that the invention is not limited thereto, since many obvious modifications can be made, and it is intended to include within this invention any such modification as may fall within the scope of the claims.

Having now described the invention, we claim:

1. A method for reconditioning a hydrogen sulfide gas removal system employing a washing solution in which hydrogen sulfide is reacted to form elemental sulfur and which has means for agglomerating said particles to enable sulfur removal from said solution and means for regenerating said solution for reuse, after said system and said solution have become contaminated with living, sulfur-feeding bacteria to an extent that normal operations of said sulfur removal means and of said solution regenerating means are substantially impaired, said reconditioning method comprising the steps of:
    (a) contacting said sulfur-feeding bacteria in said solution with a bactericidal agent selected from the group consisting of water-soluble phenols, the water-soluble salts and hydrates of phenols and the mixtures thereof to destroy substantially all of said sulfur-feeding bacteria; and
    (b) contacting said sulfur particles in said solution with a surfactant to remove a sufficient number of destroyed sulfur-feeding bacteria from surfaces of said sulfur particles to enable said particles to agglomerate in said sulfur removal means.

2. The reconditioning method defined in claim 1 wherein said bactericidal agent is phenol.

3. The reconditioning method defined in claim 1 wherein said surfactant is a non-ionic compound.

4. The reconditioning method defined in claim 3 wherein said surfactant is selected from the group consisting of:

(a) a polyoxyethylene condensate represented by the following general formula:

$$R-O-(CH_2-CH_2-O)_n-H,$$

wherein R is the residue of a fatty alcohol, acid, amide or amine having from about 10 to about 18 carbon atoms or an alkyl phenol having from about 10 to about 18 carbon atoms and where n is an integer of 1 or above;

(b) a compound represented by the following general formula:

$$HO-(CH_2-CH_2-O)_a-(\underset{\underset{CH_3}{|}}{CH}-CH_2-CH_2-O)_b-(CH_2-CH_2-O)_c-H.$$

wherein a, b, and c are integers between about 1 and about 100; and (c) an ethylene oxide adduct of acetylenic glycols represented by the general formula:

$$H-(O-CH_2-CH_2-CH_2)_y-O-\underset{\underset{R_1}{|}}{\overset{\overset{R_2}{|}}{C}}-C\equiv C-\underset{\underset{R_4}{|}}{\overset{\overset{R_3}{|}}{C}}-O-(CH_2-CH_2-O)_x-H,$$

wherein $R_1$ and $R_4$ are alkyl radicals containing from about 3 to about 10 carbon atoms, $R_2$ and $R_3$ are methyl or ethyl and x and y are integers having a sum in the range of about 3 to about 60.

5. The reconditioning method defined in claim 1 wherein said preselected surfactant is a copolymer of polypropylene oxide and ethylene oxide.

6. The reconditioning method defined in claim 1 wherein said bactericidal agent is added to said solution in an amount providing a bacterial agent concentration level in said solution of between about 5 ppm and about 5,000 ppm.

7. The reconditioning method defined in claim 6 wherein said concentration level of bactericidal agent is between about 10 ppm and about 100 ppm.

8. The reconditioning method defined in claim 1 wherein said surfactant is added to said solution in an amount providing a surfactant concentration in said solution of between about 10 ppm and about 100,000 ppm.

9. The reconditioning method defined in claim 8 wherein said concentration level of surfactant is between about 1,000 ppm and about 5,000 ppm.

10. The reconditioning method defined in claim 1 further comprising the step, after said sulfur removing means has been reconditioned by said steps (a) and (b), of subsequently adding amounts of said bactericidal agent sufficient to prevent recontamination of said system by said sulfur-feeding bacteria.

11. The reconditioning method defined in claim 10 wherein said additional bactericidal agent is added to said solution at a rate so as to maintain a concentration of said bactericidal agent in said solution of between about 10 ppm and about 100 ppm.

12. The reconditioning method defined in claim 10 wherein said bactericidal agent concentration is maintained between about 10 ppm and about 50 ppm.

13. A method for reconditioning a system for treating a hydrogen sulfide-containing gas so as to convert said hydrogen sulfide to elemental sulfur, said system employing an aqueous, alkaline washing solution containing a water-soluble anthraquinone disulfonic acid and a water-soluble vanadate, said solution being contacted with an oxidizing agent to cause formation of said elemental sulfur and to regenerate said vanadate so said solution can be reused, said system including means for removing said elemental sulfur from said solution after said system and said solution have become contaminated with living, sulfur-feeding bacteria to an extent inhibiting said regeneration of said vanadate and operation of said sulfur removing means, said reconditioning method comprising the steps of:

(a) adding to said washing solution a bactericidal agent selected from the group consisting of water-soluble phenols, the water-soluble salts and hydrates of phenols and the mixtures thereof in an amount sufficient to destroy substantially all of said sulfur-feeding bacteria; and (b) adding to said washing solution a surfactant selected from the group consisting of:

(1) a polyoxyethylene condensate represented by the following general formula:

$$R-O-(CH_2-CH_2-O)_n-H,$$

wherein R is the residue of a fatty alcohol, acid, amide or amine having from about 10 to about 18 carbon atoms or an alkyl phenol having from about 10 to about 18 carbon atoms and where n is an integer of 1 or above;

(2) a compound represented by the following general formula:

$$HO-(CH_2-CH_2-O)_a-(\underset{\underset{CH_3}{|}}{CH}-CH_2-CH_2-O)_b-(CH_2-CH_2-O)_c-H.$$

wherein a, b, and c are integers between about 1 and about 100; and (3) an ethylene oxide adduct of acetylenic glycols represented by the general formula:

$$H-(O-CH_2-CH_2-CH_2)_y-O-\underset{\underset{R_1}{|}}{\overset{\overset{R_2}{|}}{C}}-C\equiv C-\underset{\underset{R_4}{|}}{\overset{\overset{R_3}{|}}{C}}-O-(CH_2-CH_2-O)_x-H,$$

wherein $R_1$ and $R_4$ are alkyl radicals containing from about 3 to about 10 carbon atoms, $R_2$ and $R_3$ are methyl or ethyl and x and y are integers having a sum in the range of about 3 to about 60, so as to remove at least a sufficient number of said destroyed bacteria from surfaces of said sulfur particles to enable said sulfur particles to agglomerate in said sulfur removal means.

14. The reconditioning method defined in claim 13 wherein said sulfur removal means include autoclave means in which particulate sulfur is separated from said washing solution, and wherein said step of adding a bactericidal agent to said washing solution includes adding said bactericidal agent to said washing solution upstream of said autoclave means.

15. The reconditioning method defined in claim 13 further comprising, after said system and said washing solution have been reconditioned by said steps (a) and (b), the step of adding additional amounts of said bactericidal agent sufficient to prevent reinfestation of said system and said washing solution by said sulfur-feeding bacteria.

16. The reconditioning method defined in claim 15 wherein said bactericidal agent is added at a rate so as to maintain a concentration of said bactericidal agent in said washing solution between about 10 ppm and about 100 ppm.

17. The reconditioning method defined in claim 13 wherein said surfactant is selected to be a copolymer of polypropylene oxide and ethylene oxide.

18. A method for reconditioning a system for treating a hydrogen sulfide containing gas so as to convert said hydrogen sulfide to elemental sulfur, said system employing an aqueous, alkaline washing solution containing a water-soluble vanadate and water-soluble anthraquinone disulfonic acid, said solution being contacted with an oxidizing agent to cause formation of said elemental sulfur and to regenerate said vanadate so said solution can be reused, said system including autoclave means for removing agglomerated, elemental sulfur particles from said washing solution after said system has become contaminated with sulfur-feeding bacteria to an extent that agglomeration in said autoclave means of said particles into larger, easily removed sulfur particles is substantially inhibited, said reconditioning method comprising the steps of:

(a) initially adding to said washing solution upstream of said autoclave means a bactericidal agent selected from the group consisting of water-soluble phenols, the water-soluble salts and hydrates thereof, and the mixtures thereof in an amount selected to destroy substantially all of said sulfur-feeding bacteria in said system;

(b) adding to said washing solution upstream of said autoclave means a non-ionic surfactant selected from the group consisting of
(1) a polyoxyethylene condensate represented by the following general formula:

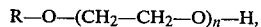

wherein R is the residue of a fatty alcohol, acid, amide or amine having from about 10 to about 18 carbon atoms or an alkyl phenol having from about 10 to about 18 carbon atoms and where n is an integer of 1 or above;

(2) a compound represented by the following general formula:

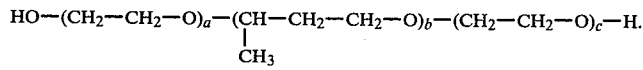

wherein a, b, and c are integers between about 1 and about 100;

(3) an ethylene oxide adduct of acetylenic glycols represented by the general formula:

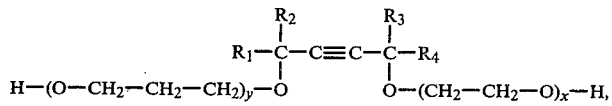

wherein $R_1$ and $R_4$ are alkyl radicals containing from about 3 to about 10 carbon atoms, $R_2$ and $R_3$ are methyl or ethyl and x and y are integers having a sum in the range of about 3 to about 60, to remove sufficient dead bacteria from sulfur particles in said autoclave means to enable said sulfur particles to agglomerate; and (c) thereafter adding to said washing solution additional quantities of said bactericidal agent in an amount selected to maintain said system substantially free of bacterial contamination.

19. The reconditioning method defined in claim 18 wherein an amount of said bactericidal agent is added in step (a) to provide a bactericidal agent concentration level in said solution between about 10 ppm and about 100 ppm and wherein said additional bactericidal agent is added in step (c) to maintain a bactericidal agent concentration level in said solution between about 10 ppm and about 50 ppm.

* * * * *